United States Patent
Senga et al.

(10) Patent No.: US 7,026,439 B2
(45) Date of Patent: Apr. 11, 2006

(54) PROCESS FOR CONTINUOUS PRODUCTION OF POLYARYLENE SULFIDE

(75) Inventors: Minoru Senga, Chiba (JP); Masaya Okamoto, Chiba (JP); Mikiya Hayashi, Chiba (JP)

(73) Assignees: Petroleum Energy Center, Tokyo (JP); Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/473,366

(22) PCT Filed: Mar. 15, 2002

(86) PCT No.: PCT/JP02/02473

§ 371 (c)(1),
(2), (4) Date: Sep. 30, 2003

(87) PCT Pub. No.: WO02/081550

PCT Pub. Date: Oct. 17, 2002

(65) Prior Publication Data

US 2004/0097697 A1    May 20, 2004

(30) Foreign Application Priority Data

Mar. 30, 2001 (JP) .............................. 2001-098377

(51) Int. Cl.
*C08G 75/00* (2006.01)
*C08G 75/14* (2006.01)
*C08G 75/18* (2006.01)

(52) U.S. Cl. ...................... 528/373; 528/387; 528/388; 528/391

(58) Field of Classification Search ................ 528/373, 528/388, 387, 391
See application file for complete search history.

(56) References Cited

U.S. PATENT DOCUMENTS

| | | | |
|---|---|---|---|
| 4,025,496 A | 5/1977 | Anderson et al. | |
| 4,066,632 A | 1/1978 | Anderson et al. | |
| 4,810,773 A * | 3/1989 | Ogata et al. | 528/388 |
| 4,919,911 A * | 4/1990 | Shirota et al. | 423/499.3 |
| 5,037,952 A | 8/1991 | Schmidt et al. | |
| 5,128,445 A * | 7/1992 | Scoggins et al. | 528/492 |
| 5,138,031 A | 8/1992 | Dorf et al. | |
| 5,231,163 A * | 7/1993 | Kosaka et al. | 528/388 |
| 5,278,283 A * | 1/1994 | Miyoshi et al. | 528/388 |
| 5,756,654 A * | 5/1998 | Sase et al. | 528/387 |
| 6,316,536 B1 | 11/2001 | Okamoto et al. | 524/494 |
| 6,538,102 B1 * | 3/2003 | Haubs et al. | 528/373 |
| 6,562,900 B1 | 5/2003 | Okamoto et al. | 524/609 |
| 2004/0097697 A1 | 5/2004 | Senga et al. | |

FOREIGN PATENT DOCUMENTS

| | | |
|---|---|---|
| EP | 0 461 655 A2 | 12/1991 |
| JP | 2-45532 | 2/1990 |
| JP | 3-50237 | 3/1991 |
| JP | 7-292107 | 11/1995 |
| WO | 99/45057 | 9/1999 |

OTHER PUBLICATIONS

Patent Abstracts of Japan, JP 08-134216, May 28, 1996.

* cited by examiner

*Primary Examiner*—P. Hampton Hightower
(74) *Attorney, Agent, or Firm*—Oblon, Spivak, McClelland, Maier & Neustadt, P.C.

(57) ABSTRACT

There is disclosed a process for continuously producing a polyarylene sulfide which comprises reacting a sulfur source with a dihalogenated aromatic compound in an aprotic organic solvent, characterized by maintaining the content of the dihalogenated aromatic compound in the polymerization liquid after the substantial completion of the polymerization reaction at 5 mg/g or higher. It is made possible by the process according to the present invention to efficiently produce the polyarylene sulfide which has a high molecular weight and is excellent in thermal stability.

7 Claims, No Drawings

PROCESS FOR CONTINUOUS PRODUCTION OF POLYARYLENE SULFIDE

TECHNICAL FIELD

The present invention relates to a process for producing a polyarylene sulfide. More particularly, it pertains to a process for continuously producing a polyarylene sulfide which has a high molecular weight and is excellent in thermal stability.

BACKGROUND ART

A polyarylene sulfide (hereinafter sometimes abbreviated to as "PAS"), especially polyphenylene sulfide (hereinafter sometimes abbreviated to as "PPS") is known as an engineering plastic which is excellent in mechanical strength and heat resistance and the like and which has good electrical characteristics and high rigidity. Thus it is widely employed as a variety of materials such as electronic parts, electrical parts and mechanical parts. In particular, a molded article of a resin composition composed of polyphenylene sulfide and an inorganic filler is employed for a variety of purposes of use.

With regard to a conventional process for the production of a PAS by reacting a dihalogenated aromatic compound such as p-dichlorobenzene with an alkali metal sulfide such as sodium sulfide and lithium sulfide in the an aprotic organic polar solvent such as N-methyl-2-pyrrolidone (NMP), a prescribed amount of water is added to the process, since the alkali metal sulfide is insoluble in a polar solvent. In this case, the alkali metal sulfide is dissolved in a polar solvent in the presence of water, and a part thereof is turned into an alkali metal hydrosulfide by hydrolysis. The alkali metal hydrosulfide thus formed suppresses the improvement in the molecular weight of a PAS, turns a terminal of a polymer into —SH group, thereby having caused such problems as the production of a PAS having inferior thermal stability.

In order to solve the above-mentioned problems, there are proposed a method for imparting a high molecular weight to a PAS which comprises adding water to reactants, and thereafter carrying out preliminary polymerization at a low temperature {refer to Japanese Patent Application Laid-Open No. 9228/1989 (Showa 64)}, a method which comprises carrying out preliminary polymerization by adding a small amount of water to reactants so as to increase the conversion of an alkali metal sulfide, and thereafter carrying out polycondensation by adding water to the reactants {refer to Japanese Patent Application Laid-Open No. 7332/1986 (Showa 61)} and the like.

However, any and all of the aforesaid methods still remain unsatisfactory in regard to the obtainment of a PAS which has a high molecular weight and is excellent in thermal stability.

DISCLOSURE OF THE INVENTION

The present invention has been made in the light of the problems as mentioned above. An object of the present invention is to provide a process for continuously producing a PAS which has a high molecular weight and is excellent in thermal stability. Another object of the present invention is to provide a PAS which has a high molecular weight and is excellent in thermal stability and besides a composition of the PAS.

In view of the above-mentioned problems, intensive extensive research and investigation were made by the present inventors. As a result, it has been found that in the case of producing a PAS by reacting a dihalogenated aromatic compound with a sulfur source such as a metal sulfide in a polar solvent, the objects of the present invention can be achieved by performing polymerization reaction, while the dihalogenated aromatic compound is added to the reaction system in a specific excess amount over the sulfur source, and keeping the content of the dihalogenated aromatic compound in the polymerization liquid after the completion of the polymerization reaction at a specific concentration or higher.

Thus the present invention has been accomplished on the basis of the foregoing findings and information. Specifically, the gist and summary of the present invention reside in a process for continuously producing a polyarylene sulfide which comprises reacting a sulfur source with a dihalogenated aromatic compound in an aprotic organic solvent, characterized by maintaining the content of the dihalogenated aromatic compound in the polymerization liquid after the substantial completion of the polymerization reaction at 5 mg/g or higher.

THE MOST PREFERRED EMBODIMENT TO CARRY OUT THE INVENTION

In the following, more detailed description will be given of the present invention.

1. The Process for Producing a PAS

The process for continuously producing a polyarylene sulfide according to the present invention comprises reacting a sulfur source with a dihalogenated aromatic compound in an aprotic organic solvent, and is characterized by maintaining the content of the dihalogenated aromatic compound in the polymerization liquid after the substantial completion of the polymerization reaction at 5 mg/g or higher.

(1) Starting Material Components

① Dihalogenated Aromatic Compound

The dihalogenated aromatic compound which is used for the production process according to the present invention is exemplified by dihalogenated benzene such as p-dihalogenated benzene and m-dihalogenated benzene, alkyl-substituted dihalogenated benzene, cycloalkyl-substituted dihalogenated benzene and the like such as 2,3-dihalogenated toluene; 2,5-dihalogenated toluene; 2,6-dihalogenated toluene; 3,4-dihalogenated toluene;2,5-dihalogenated xylene; 1-ethyl-2,5-dihalogenated benzene; 1,2,4,5-tetramethyl-3,6-dihalogenated benzene; 1-n-hexyl-2,5-dihalogenated benzene; and 1-cyclohexy-2,5-dihalogenated benzene, aryl-substituted dihalogenated benzene such as 1-phenyl-2,5-dihalogenated benzene; 1-benzyl-2,5-dihalogenated benzene; and 1-p-toluyl-2,5-dihalogenated benzene, dihalobiphenyl such as 4,4'-dihalobiphenyl, dihalonaphthalene such as 1,4-dihalonaphthalene; 1,6-dihalonaphthalene; and 2,6-dihalonaphthalene, and the like, of which p-dichlorobenzene is particularly preferable.

② Aprotic Organic Solvent

Examples of preferably usable aprotic organic solvent include in general, organic polar solvents such as amide compounds, lactam compounds, urea compounds, organosulfur compounds and cyclic organophosphorus compounds, which can be used as single solvent or a mixed solvent.

The above-mentioned amide compounds among the polar solvents are exemplified by N,N-dimethylformamide; N,N-diethylformamide; N,N-dimethylacetoamide; N,N-diethylacetoamide; N,N-dipropylacetoamide; N,N-dimethylbenzoic acid amide, etc.

The aforesaid lactam compounds are exemplified by N-alkyl-caprolactam such as caprolactam; N-methylcaprolactam; N-ethyl-caprolactam; N-isopropylcaprolactam; N-isobutylcaprolactam; N-n-propylcaprolactam; N-n-butylcaprolactam; and N-cyclohexylcaprolactam; N-methyl-2-pyrrolidone (NMP); N-ethyl-2-pyrrolidone; N-isopropyl-2-pyrrolidone; N-isobutyl-2-pyrrolidone; N-n-propyl-2-pyrrolidone; N-n-butyl-2-pyrrolidone;N-cyclohexyl-2-pyrrolidone; N-methyl-3-methyl-2-pyrrolidone; N-ethyl-3-methyl-2-pyrrolidone;N-methyl-3,4,5-trimethyl-2-pyrrolidone; N-methyl-2-piperidone; N-ethyl-2-piperilidone; N-isopropyl-2-piperidone; N-methyl-6-methyl-2-piperidone; N-methyl-3-ethyl-2-piperidone, etc.

The aforesaid urea compounds are exemplified by tetramethylurea; N,N'-dimethylethyleneurea; N,N'-dimethylpropyleneurea, etc.

The aforesaid organosulfur compounds are exemplified by dimethylsulfoxide; diethylsulfoxide; diphenylsulfone; 1-methyl-1-oxosulfolane; 1-ethyl-1-oxosulfolane; 1-phenyl-1-oxosulfolane etc.

The aforesaid cyclic organophosphorus compounds are exemplified by 1-methyl-1-oxophosfolane; 1-n-propyl-1-oxophosfolane; 1-phenyl-1-oxophosfolane, etc.

Any of the above-exemplified aprotic organic polar solvent can be used alone or by mixing with at least one other or by mixing with a solvent which is not cited above to the extent that the object of the present invention is not impaired by the mixing.

Of the various aprotic organic polar solvents as exemplified above are preferable N-alkylcaprolactam and N-alkylpyrrolidone, among which N-methyl-2-pyrrolidone is particularly preferable.

③ Sulfur Source

There are mainly usable as a sulfur source, an metal sulfide typified by an alkali metal compound such as sodium sulfise, lithium sulfide and potassium sulfide. Any of the above-mentioned sulfur sources may be used alone or in combination with at least one other of them, or an alkaline earth metal sulfide, or a sulfur source other those mentioned above.

④ A Phase Separation Agent

There are preferably usable as a phase separation agent, lithium chloride, sodium acetate and a salt of an alkali metal such as lithium, water and the like, of which lithium chloride is preferably used in particular.

⑤ Others

In the present invention, a comonomer, a branching agent, an end terminator and the like may be used in combination with the above-mentioned dihalogenated aromatic compound. Examples of the comonomer include 2,3-dichlorophenol; 2,3-dibromophenol; 2,4-dichlorophenol; 2,4-dibromophenol; 2,5-dichlorophenol; 2,5-dibromophenol; 2,4-dichloroaniline; 2,4-dibromoaniline; 2,5-dichloroaniline; 2,5-dibromoaniline;3,3-dichloro-4,4'-diaminobiphenyl; 3,3-dibromo-4,4'-diaminobiphenyl; 3,3-dichloro-4,4'-dihydroxybiphenyl; 3,3-dibromo-4,4'-dihydroxybiphenyl; di(3-chloro-4-amino)phenylmethane; m-dichlorobenzene; m-dibromobenzene; o-dichlorobenzene; o-dibromobenzene; 4,4'-dichlorodiphenyl ether; and 4,4'-dichlorodiphenyl sulfone.

Examples of the branching agent include 1,2,4-trichlorobenzene; 1,3,5-trichlorobenzene; 1,2,3-trichlorobenzene; 2,5-dichloronitrobenzene;and 2,4-dichloronitrobenzene.

Examples of the end terminator include chlorobenzene; bromobenzene; iodobenzene; p-chloronitrobenzene; o-chloronitrobenzene; p-chlorocyanobenzene; o-chlorocyanobenzene; and halogenated phenol such as p-bromophenol; m-bromophenol; o-bromophenol; p-chlorophenol; m-chlorophenol; o-chlorophenol; p-fluorophenol; m-fluorophenol; o-fluorophenol; p-iodophenol; m-iodophenol; and o-iodophenol. Of these are preferable p-bromophenol and p-chlorophenol.

(2) Production of PAS

① Amount of Starting Raw Material to be Used

The process for producing a polyarylene sulfide according to the present invention is characterized by maintaining the content of the dihalogenated aromatic compound in the polymerization liquid after the substantial completion of the polymerization reaction at 5 mg/g or higher, preferably in the range of 6 to 20 mg/g. By doing in this manner, it is made possible to efficiently obtain a PAS which has a high molecular weight and is excellent in thermal stability. By the term "after the substantial completion of the polymerization reaction" as used herein is meant the point of time when the polymerization procedure comes to the end, that is, the point of time of the outlet of a continuous polymerizer.

In the case of continuously producing a PAS in accordance with the present invention by reacting a sulfur source with a dihalogenated aromatic compound as principal starting raw material components, the amount of the starting raw material to be used can be determined so that the content of the dihalogenated aromatic compound in the polymerization liquid after the substantial completion of the polymerization reaction falls within the above-mentioned range.

Specifically, the amount of the dihalogenated aromatic compound to be used is preferably at least 1.05 by molar ratio based on sulfur source, more preferably in the range of 1.06 to 1.20 by molar ratio based thereon. The molar ratio, when departing from the aforesaid range, sometimes gives rise to incapability of assuring a PAS which has a high molecular weight and is excellent in thermal stability.

In the case of using water, the amount thereof to be used is preferably in the range of 0.05 to 4.0 by molar ratio based on sulfur source, more preferably in the range of 0.1 to 3.0 by molar ratio based thereon. The molar ratio, when being less than 0.05, brings about a fear of insufficient reaction, whereas the molar ratio, when being more than 4.0 causes a fear of incapability of assuring a PAS which has a high molecular weight.

In order to accelerate the polymerization reaction in the present invention, a metal hydroxide such as an alkali metal compound and/or N-methylaminobutyric acid salt of a metal such as N-methylaminobutyric acid salt of an alkali metal may be added to the reaction system in addition to the above-mentioned starting raw material. The amount of the additive to be used is preferably in the range of 0.01 to 1.0 by molar ratio based on a metal sulfide, more preferably in the range of 0.05 to 0.8 by molar ratio based thereon.

② Reaction Conditions

The above-mentioned polymerization reaction in the production process according to the present invention may be carried out at a temperature in the range of 230 to 290° C., preferably 240 to 280° C., more preferably 250 to 270° C. Prior to the polycondensation, preliminary polymerization can be put into practice at a temperature in the range of 180 to 230° C., preferably 190 to 220° C., more preferably 195 to 215° C. The reaction time of polycondensation is in the range of 0.5 to 10 hours, preferably 1.0 to 10 hours, more preferably 1.5 to 10 hours. The reaction time, when being less than 0.5 hour, gives rise to a fear of insufficient reaction, thereby leading to an insufficient increase in the molecular weight of PAS, whereas the reaction time, when being more than 10 hours, is not so effective in particular as expected.

In the present invention, the number of stages that are usable in the polymerization vessel, which is not specifically limited, may be multistage wherein the temperature condition may be altered per stage.

The polymerization vessel and an agitational impeller that are used in the process according to the present invention are not specifically limited, but the polymerization vessel is preferably of the type well suited for complete mixing, and the agitational impeller is preferably a large size impeller such as a Full zone impeller.

The polymerization solution obtained after the substantial polymerization can be subjected to washing operation by adding water thereto to the extent that the PAS is not solidified. The amount of water, which varies depending upon the amount and the temperature of the polymerization solution, may be such an amount that the PAS is not solidified nor precipitated by overcooling. It is preferable to usually agitate the content in a washing vessel so that the polymerization solution and water are sufficiently mixed with each other.

A washing solution is not specifically limited provided that impurities or byproducts which are stuck to the polymer do not exert adverse influence on the polymer by being dissolved in the washing solution. Examples of the washing solution include methanol, acetone, benzene, toluene, water and NMP, of which water is preferable.

The polymerization solution after the completion of the polymerization reaction is sent to a separation vessel, where the solution is subjected to a separation procedure to separate it into a polymer phase and a solvent phase.

For the purpose of assuring more sufficient effect on washing and separation, the steps of washing and separation are preferably repeated optional plural times.

In the present invention, since the polymer phase in which the steps of washing and separation have been completed still contains a solvent, it is preferable to remove the solvent. The solvent removal method is not specifically limited, but may be in accordance with a well known solvent removal method which is used in the production of PAS, for instance, a flashing method disclosed in Japanese Patent Application Laid-Open No. 33878/1995 (Heisei 7).

The PAS in which the solvent removal procedure has been completed can be taken out in a molten state or in the form of granule after being solidified by cooling using a proper cooling method. The cooling method is exemplified by air cooling, water cooling, oil cooling and the like.

2. Polyarylene Sulfide (PAS)

The PAS which is obtained by the process according to the present invention has a sufficiently high molecular weight, including an inherent viscosity [η] of at least 0.10, preferably at least 0.14, a melt index [MI] of 0 to 1000 g/10 minutes. Such a resin as described above, which is excellent in thermal stability, is usable for various purposes of use under severe conditions.

The above-mentioned inherent viscosity is measured with a Ubbellohde viscometer for 0.4 g/deciliter solution of the polyarylene sulfide obtained by the foregoing process in a -chloronaphthalene at 206° C.

In addition, as an evaluation method for thermal stability in the present invention, there is suitably usable a method which comprises observing the variation in the inherent viscosity [η] of PAS by using the mixture of PAS with NMP and maintaining the mixture at a high temperature (265° C.) for 8 hours. In this case, the mixing ratio of PAS to NMP is optional, but in order to enhance the reproducibility, the evaluation is made usually by blending each of them in a same amount (mass), for instance 2.5 g each. Moreover taking into consideration the solubility of this kind of resin, it is convenient to express the inherent viscosity [η] by the value at 206° C.

The PAS which is obtained by the production process according to the present invention is a polymer containing at least 70 mol % of the repeating unit, for instance, represented by the constitutional formula: Ar—S—, wherein Ar is an arylene group. Typical PAS among those are a PPS containing at least 70 mol % of the repeating unit represented by the constitutional formula (I) and a PPS containing at least 70 mol % of the repeating unit represented by the constitutional formula (II):

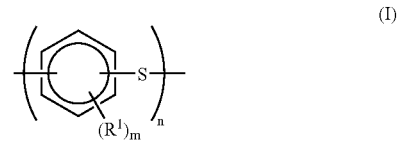

(I)

wherein $R^1$ is a substituent selected from an alkyl group having 1 to 6 carbon atoms, an alkoxy group, a phenyl group, a metal salt of a carboxylic acid, an amino group, a nitro group or a halogen atom such as fluorine, chlorine or bromine; m is an integer of from 0 to 4; and n is an average degree of polymerization in the range of 10 to 200:

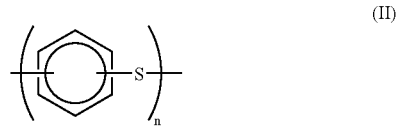

(II)

wherein n is as previously defined.

The production process according to the present invention is effective for any type of known molecular structures of PAS including a substantially linear molecular structure without branched or crosslinked structure and a molecular structure having branched or crosslinked structure, said structure being dependent upon the production process thereof. The PAS is exemplified by a homopolymer or copolymer containing as a repeating unit, at least 70 mol %, preferably at least 80 mol % of para-phenylene sulfide unit. Examples of the constitutional unit for copolymerization include meta-phenylene sulfide unit, ortho-phenylene sulfide unit, p,p'-diphenyleneketone sulfide unit, p,p'-diphenylenesulfone sulfide unit, p,p'-biphenylene sulfide unit, p,p'-diphenylene ether sulfide unit, p,p'-diphenylenemethylene sulfide unit, p,p'-diphenylenecumenyl sulfide unit and naphthy sulfide unit. Further as an object of the polyarylene sulfide resin according to the present invention, there are included in addition to the polyarylene sulfide having a substantially linear structure, a branched or crosslinked polyarylene sulfide in which a small amount of a monomer having at least three functional groups as a part of monomers is polymerized and a blended polymer in which the polyarylene sulfide just cited is blended with the above-cited substantially linear polymer.

The PAS resin composition according to the present invention comprises 20 to 90% by weight, preferably 20 to 70% by weight, more preferably 40 to 70% by weight of the PAS to be obtained in the above-mentioned process and 80 to 10% by weight, preferably 80 to 30% by weight, more preferably 60 to 30% by weight of an inorganic filler. Examples of the inorganic filler include glass fiber, carbon fiber, aramid fiber, potassium titanate whisker, silicon carbide whisker, mica ceramics fiber, wollastonite, mica, talc, silica, alumina, kaolin, clay, silica - alumina, carbon black, calcium carbonate, titanium oxide, lithium carbonate, molybdenum disulfide, graphite, iron oxide, glass beads, calcium phosphate, calcium sulfate, magnesium carbonate, magnesium phosphate, silicon nitride and hydrotalcite. Any of the above-cited fillers may be used alone or in combination with at least one other. Of the above-cited fillers, glass fiber is particularly preferable.

The glass fiber is not specifically limited, but may be selected for use from among alkali glass, low alkali glass and non-alkali glass. The fiber length is preferably 0.1 to 8 mm, more preferably 0.3 to 6 mm, and the fiber diameter is preferably 0.1 to 30 micrometer (μm), more preferably 0.5 to 25 μm. The fiber length, when being less than 0.1 mm, leads to lowered reinforcing effect, whereas the length, when being more than 8 mm, brings about a decrease in fluidity of the composition. The fiber diameter, when being less than 0.1 μm, brings about a decrease in fluidity of the resin, whereas the diameter, when being more than 30 μm, leads to lowered strength of the composition. The configuration of the glass fiber is not specifically limited, but may be selected for use from a variety of forms such as roving, milled fiber and chopped strand. The glass fiber may be used alone or in combination with at least one other.

In order to enhance the affinity for a resin, the glass fiber may be subjected to a surface treatment with any of a silane based coupling agent of aminosilane base, epoxysilane base, vinylsilane base or methacrylicsilane base, a titan ate based coupling agent of tetramethyl-orthotitanate or tetraethyl-orthotitanate, a chromium complex compound and a boron compound.

The process for preparing the PAS resin composition according to the present invention is not specifically limited. The composition can be prepared by blending the PAS, an inorganic filler and an additive to be used at need such as a silane based coupling agent, antioxidant, heat stabilizer, lubricant, plasticizer, electroconductivity imparting agent, coloring agent and pigment; mixing the components with one another by means of a tumbler blender, Henschel mixer or the like; and subjecting the resultant mixture to melt kneading granulation by the use of a single screw extruder or multi-screw extruder or by using a kneader, Banbury mixer or the like.

A molded article according to the present invention can be produced from the above-described PAS resin composition by means of an injection molding method, extrusion molding method or the like method.

It is made possible through the process for continuously producing a polyarylene sulfide according to the present invention to obtain the polyarylene sulfide which has a high molecular weight and at the same time, is excellent in thermal stability by maintaining the content of the dihalogenated aromatic compound in the polymerization liquid after the substantial completion of the polymerization reaction at 5 mg/g or higher.

The PAS which is obtained by the production process according to the present invention is preferably usable as materials for a variety of molded articles such as materials for films, fibers, mechanical parts, electrical parts, electronic parts and the like.

In what follows, the present invention will be described in more detail with reference to working examples. Evaluations were made of the PDCB concentration, the inherent viscosity of PAS and the thermal stability thereof by the following procedures:

{Measurement of PDCB Concentration}

The PDCB concentration was determined by an internal standard method by the use of gas chromatography, wherein use was made of chloroform as the diluting solvent and 1,2,4-TCB as the internal standard.

{Evaluation Method for Thermal Stability}

A miniatured pressure tight cell which had an internal volume of 10 milliliter (mL) and was made of stainless steel type SUS 316 was charged with 2.5 g of PAS and 2.5 g of N-methyl-2-pyrrolidone (NMP), and was hermetically sealed. The cell was heated in an oil bath to raise the temperature thereof to 265° C., which was maintained for 8 hours. Thereafter the cell was taken out from the oil bath and cooled, and then the PAS was withdrawn from the cell, washed with water and dried. Thus the inherent viscosity [η] of the dried PAS was measured by the following procedure.

{Measurement of Inherent Viscosity}

A sample of the PAS in an amount of 0.04±0.001 g was dissolved in 10 mL of α-chloronaphthalene at 235° C. within 15 minutes, and measurements were made of the viscosity of the resultant solution to be measured in a thermostat at 206° C. and the viscosity of the α-chloronaphthalene free from the PAS polymer to determine the relative viscosity. The inherent viscosity [η] was calculated by the following formula using the relative viscosity thus obtained.

[η](deciliter/g)=ln (relative viscosity)/polymer concentration

EXAMPLE 1

Preliminary Polymerization

A 1 m³ titanium-made starting material synthesis vessel equipped with a stirrer was charged with 633 kg of N-methyl-2-pyrrolidone(NMP) and 100 kg (2.38 kilomole) of lithium hydroxide (LiOH.H₂O), and the resultant mixture was heated to and kept at 140° C. The water contained in the lithium hydroxide as a starting material was removed by batchwise distillation. Thereafter, 65 N-kiloliter of gaseous hydrogen sulfide was blown into the mixture at a temperature kept at 130° C. to synthesize lithium hydrosulfide.

Subsequently, blowing of hydrogen sulfide was stopped, and the synthesis vessel was again heated to raise the temperature up to 205° C. Accompanying the temperature rising, the water by-produced on blowing hydrogen sulfide was removed by batchwise distillation, while lithium sulfide was produced from lithium hydrosulfide.

After the completion of the reaction, the reaction product contained 1.08 kilomole of lithium sulfide and 0.214 kilomole of lithium N-methl-4-aminobutyrate. In the condition of a temperature 205° C., the reaction product was added 168.3 kg (1.145 kilomole) of p-dichlorobenzene (PDCB) and further 5.3 kg of pure water to proceed with reaction at 210° C. for 3 hours. Then the reaction liquid was cooled to 60° C. or lower, and the resultant reaction mixture was taken out from the reactor into a 20 liter vessel. The conversion of the PDCB was 85%.

Continuous Polymerization

A 10 liter autoclave equipped with a Full zone impeller was charged with 855 g of lithium chloride as a phase separation agent and 5145 g of NMP, and was heated to raise the temperature up to 260° C. The above-prepared prepolymer was preserved at 60° C. and was continuously supplied to the reactor at a flow rate of 33.3 g/minute by the use of a gear pump.

On the other hand, about 150 to 200 g of the polymerization mixture was withdrawn from the reactor through a withdrawing nozzle every 5 minutes approx. so as to maintain a constant liquid level. The procedure was continued for 24 hours, when the withdrawn sample was separated into the polymer and polymerization liquid by means of decantation filtration. Then the concentration of PDCB in the polymerization liquid was measured. The resultant polymer was washed twice with hot water and further with acetone, and then in a vacuum was dried at 120° C. for 12 hours to evaluate the inherent viscosity [η] and Δ η. The results are given in Table 1.

EXAMPLE 2

The procedure in Example 1 was repeated to obtain a PAS polymerization mixture except that the amount of p-dichlorobenzene (PDCB) to be used was altered from 168.3 kg (1.145 kilomole) to 171.4 kg (1.166 kilomole). The results of evaluation made in the same manner as in Example 1 are given in Table 1.

EXAMPLE 3

The procedure in Example 1 was repeated to obtain a PAS polymerization mixture except that the amount of p-dichlorobenzene (PDCB) to be used was altered from 168.3 kg (1.145 kilomole) to 174.6 kg (1.188 kilomole). The results of evaluation made in the same manner as in Example 1 are given in Table 1.

COMPARATIVE EXAMPLE 1

The procedure in Example 1 was repeated to obtain a PAS polymerization mixture except that the amount of p-dichlorobenzene (PDCB) to be used was altered from 168.3 kg (1.145 kilomole) to 162.0 kg (1.102 kilomole). The results of evaluation made in the same manner as in Example 1 are given in Table 1.

TABLE 1

|  | PDCB concentration (mg/g) | [η](dl/g) | Δ[η](dl/g) |
| --- | --- | --- | --- |
| Example 1 | 6.5 | 0.31 | 0.03 |
| Example 2 | 9.5 | 0.26 | 0.02 |
| Example 3 | 11.9 | 0.24 | 0 |
| Comparative Example 1 | 4.1 | 0.26 | 0.18 |

INDUSTRIAL APPLICABILITY

A polyarylene sulfide is known as an engineering plastic which is excellent in mechanical strength and heat resistance and the like and which has good electrical characteristics and high rigidity. Thus it is widely employed as a variety of materials such as electronic parts, electrical parts and mechanical parts. In particular, a molded article of a resin composition composed of polyphenylene sulfide and an inorganic filler can be employed for a variety of purposes of use.

The invention claimed is:

1. A process for continuously producing a polyarylene sulfide which comprises reacting a sulfur source with a dihalogenated aromatic compound in a polymerization liquid comprising the sulfur source, the dihalogenated aromatic compound and an aprotic organic solvent, and maintaining the content of the dihalogenated aromatic compound in the polymerization liquid at 5 mg/g or higher after the substantial completion of said reacting.

2. The process according to claim 1, wherein the content of the dihalogenated aromatic compound in the polymerization liquid after the substantial completion of said reacting is maintained in the range of 6 to 20 mg/g.

3. The process according to claim 1, wherein the dihalogenated aromatic compound is present at a ratio of at least 1.05 expressed in terms of a molar ratio of the dihalogenated aromatic compound/the sulfur source at the time of said reacting.

4. The process according to claim 1, wherein the dihalogenated aromatic compound is present at a ratio in the range of 1.06 to 1.20 expressed in terms of a molar ratio of the dihalogenated aromatic compound/the sulfur source at the time of said reacting.

5. The process according to claim 1, wherein the polymerization reaction is carried out in the presence of a phase separation agent.

6. The process according to claim 1, wherein the polymerization reaction is carried out in the presence of water.

7. The process according to claim 1, wherein the polyarylene sulfide has an inherent viscosity [η] of at least 0.1.

* * * * *